June 9, 1953  G. PETERSON  2,641,741
CRYSTAL CONTROLLED MODULATED OSCILLATOR
Filed Feb. 21, 1949  3 Sheets-Sheet 1

INVENTOR.
GLEN PETERSON
BY Hudson & Young
ATTORNEYS

*INVENTOR.*
GLEN PETERSON
BY *Hudson & Young*
*ATTORNEYS*

June 9, 1953 G. PETERSON 2,641,741
CRYSTAL CONTROLLED MODULATED OSCILLATOR
Filed Feb. 21, 1949 3 Sheets-Sheet 3

INVENTOR.
GLEN PETERSON
BY Hudson & Young
ATTORNEYS

Patented June 9, 1953

2,641,741

UNITED STATES PATENT OFFICE 2,641,741

CRYSTAL CONTROLLED MODULATED OSCILLATOR

Glen Peterson, Tulsa, Okla., assignor to Phillips Petroleum Company, a corporation of Delaware Application February 21, 1949, Serial No. 77,658

15 Claims. (Cl. 332—26)

This invention relates to a circuit for controlling a modulated oscillator, to an oscillator embodying said circuit, and to a piezo-electric assembly used in said circuit.

In seismic surveying, measurement must be made of very small earth displacement of as little amplitude as $10^{-8}$ inch. Heretofore, this has been accomplished by utilizing a very sensitive transducer or seismometer for converting the seismic waves into electrical currents representative thereof, the output of this seismometer being fed through a high gain amplifier to a recording system. This type of system requires the use of a cable connecting each seismometer with the recording equipment, thereby substantially decreasing the flexibility of the system. It has been proposed to replace this cable with a radio linkage but, where this is done, it is necessary to modulate the radio wave with seismic signals which requires the use of a suitable modulator unit. The modulator system, in connection with the use of high gain amplifiers, substantially increases the size, weight, and initial cost of the equipment, as well as the operating time and expense in using such equipment.

In accordance with this invention, I utilize the transducer or seismometer itself to frequency modulate a radio frequency oscillator, thereby directly producing a modulated signal with a minimum of heavy and bulky equipment. In order to accomplish this result, it is obvious that the very low amplitude seismic signals must produce the maximum frequency variation in the transmitter circuit if the radio frequency wave is to be modulated to a sufficient extent as to produce accurate records at the receiver-recorder unit. With the best capacitive seismometers hitherto used, the capacitive change produced by an instant seismic signal is only a small fraction of a micro-microfarad while the residual or fixed capacity of the seismometer is in the neighborhood of several micro-microfarads. Thus, even the strongest seismic signal produces only a minute variation in the overall capacitance. The same is true of a seismometer of the inductive type wherein the inductance is varied by the seismic signals. In this case too, the change in inductance produced by a seismic signal of large magnitude produces only a minute change in the total inductance of the seismometer.

It is an object of my invention to provide a modulating circuit which produces significant changes in the frequency of a modulated signal responsive to capacitance or inductance variations produced in a seismometer by seismic signals.

It is a further object of the invention to provide a frequency modulated oscillator of high frequency stability which accurately responds to seismic signals of small magnitude.

It is a still further object of the invention to provide a frequency modulated oscillator embodying my novel modulating circuit.

It is a further object of the invention to provide a circuit which is simple, reliable in operation, and utilizes standard circuit components.

Various other objects, advantages and features of the invention will become apparent from the following detailed description taken in conjunction with the accompanying drawings, in which.

Figure 3:
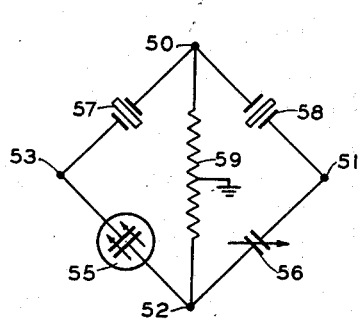
Figures 3 and 4 are schematic circuit diagrams of two forms which the modulating circuit may assume.
Figure 8:
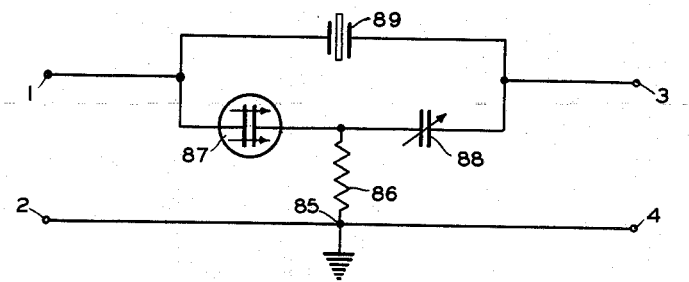
Figure 9:
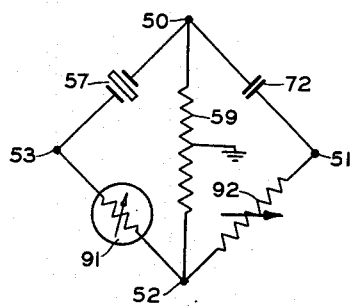
Figure 10:
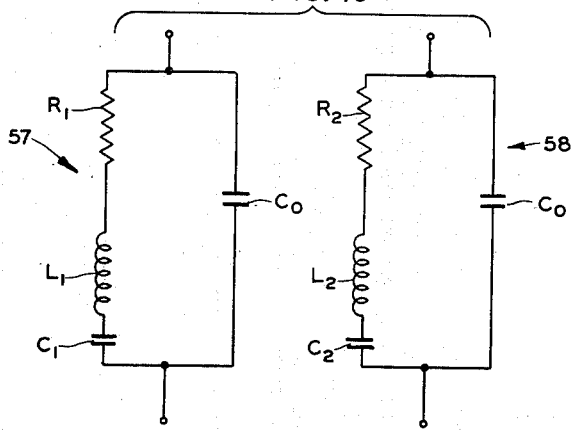

Figures 6, 7, 8, and 9 are schematic circuit diagrams showing null-type networks adapted for use in the circuit of this invention; and Figure 10 is a schematic diagram showing the equivalent circuits of the crystals utilized in Figure 3 and other figures.

Figure 1:
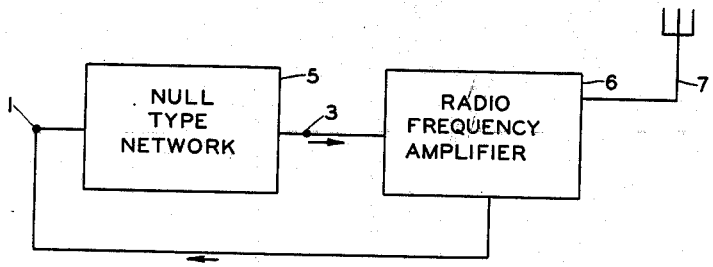
Figure 1 is a block diagram of the oscillator circuit.

Referring now to the drawings in detail, and particularly to Figure 1, the modulated oscillator of this invention is represented, in its simplest form, by the block diagram which includes a null-type network 5 having a variable impedance type seismometer included within it. The arrangement of the network is such that the output voltage is essentially zero at one seismometer amplitude or, alternately, a very small output voltage is produced by the network of such predetermined amplitude. The output of the network 5 is fed to a radio frequency amplifier 6 which drives an antenna 7 to produce frequency modulated signals. A portion of the output of the amplifier 6 is fed back to the network 5 and the amplifier has sufficient gain to overcome the attenuation produced by network 5. As will be pointed out hereinafter, network 5 may be of the Wheatstone bridge type, of the bridge-T type, or any other null-type network. Preferably, the network is of the Wheatstone bridge type and it is associated with an amplifier, such as that shown by Figure 2.

Figure 2:
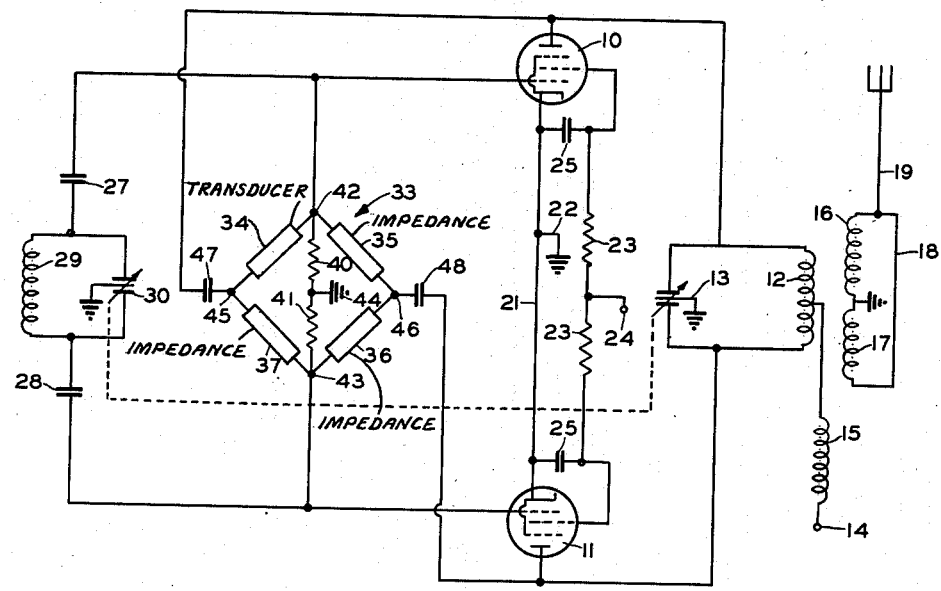
Figure 2 is a schematic circuit diagram of a modulated oscillator utilizing the novel modulating circuit of this invention.

Referring now to Figure 2, I have shown a modulated oscillator circuit utilizing two electron tubes 10 and 11 which are connected in push-pull circuit arrangement. The anodes of tubes 10 and 11 are connected, respectively, to the opposite terminals of a plate tank circuit comprising an inductance 12 and a variable condenser 13 in shunt therewith, the center tap of inductance 12 being connected to a positive power supply terminal 14 through a radio frequency choke 15. A secondary winding consisting of two reverse wound coils 16 and 17, inductively coupled to tank inductance 12, and connected in parallel are used to energize antenna 19. The cathodes of tubes 10 and 11 are interconnected by a lead 21 which is grounded at 22. The suppressor grids of the tubes are connected to the cathodes thereof and the screen grids are connected through voltage dropping resistors 23, respectively, to a positive power supply terminal 24, each screen grid also being connected to ground through a by-pass condenser 25.

The control grids of tubes 10 and 11 are connected through the respective coupling condensers 27, 28 to opposite terminals of a grid tank circuit comprising an inductance 29 and a variable condenser 30 in shunt therewith. The tank circuits are tuned broadly to the radio frequency band within which it is desired to operate the transmitter and the frequency of oscillation of the radio frequency signal is controlled by a novel modulator unit generally indicated by reference character 33. Alternatively, a pair of triodes may also be used in this circuit in place of the pentodes.

The modulator unit 33 includes impedance elements 34, 35, 36, and 37 which, in the present example, are connected in a Wheatstone bridge arrangement and the impedance of element 34 is variable in accordance with seismic signals impressed thereon in geophysical prospecting work. That is to say, impedance unit 34 represents a transducer or seismometer for converting seismic waves into impedance or reactance variations representative thereof. The values of impedances 35, 36 and 37 are so chosen as to provide a bridge balance at a predetermined radio frequency when no seismic signal is impressed upon the seismometer 34.

The bridge circuit also includes resistances 40 and 41 which are connected in series across bridge terminals 42 and 43, the junction between these resistors being grounded, as indicated at 44. Normally these resistances are of the same value and serve to balance the bridge to ground potential, and also serve as grid leaks for the tubes 10 and 11. However, if the impedance units 34, 35, 36, and 37 are not essentially symmetric pairs with respect to ground potential, it may be necessary to substitute complex impedances for the resistances 40, 41 in order to obtain balancing of the bridge at a predetermined operating frequency.

Bridge terminals 42, 43 are connected directly to the respective control grids of electron tubes 10 and 11 while the opposite terminals 45, 46 are connected to the respective anodes of tubes 10 and 11 through coupling condensers 47 and 48.

During the operation of the circuit, tubes 10 and 11 function as amplifiers and a portion of the output from tank circuit 12, 13 is fed back to the input circuit or grid circuit of the tubes to maintain continuous oscillation in the circuit. The oscillations, within the broad band to which the tank circuits are tuned, are controlled in frequency by the reactance of bridge circuit 33 which, in turn, is controlled by the reactance of seismometer 34. In this manner, the frequency of the oscillator signals is directly controlled by the seismometer. It is to be noted that, due to the balanced Wheatstone bridge circuit, the fixed capacitance or inductance of the seismometer which, as previously stated, is tremendously greater than the change in capacitance or inductance caused by seismic signals, is balanced out so that the oscillator frequency is directly controlled by the seismometer with the result that a maximum frequency variation is obtained with a minimum variation in impedance.

As a specific example, I have illustrated the use of the bridge circuit with a capacitive seismometer in Figure 3. The circuit of Figure 3 is intended to be substituted for the circuit 33 of Figure 2, the bridge terminals 50, 51, 52, and 53 of Figure 3 being connected in the circuit in the same fashion as the terminals 42, 46, 43, and 45, respectively, of bridge 33. The circuit of Figure 3 includes a capacitative seismometer 55, the capacitance of which varies in accordance with the amplitude of seismic waves impressed thereon. The residual capacity of seismometer 55 is balanced by a variable condenser 56 and the other two arms of the bridge are formed by piezoelectric crystals 57 and 58 which are cut to slightly different frequencies. In practical seismic work, the frequency of crystal 57 may be of the order of 10 megacycles, while the frequency of crystal 58 may be from the order of 10.5 megacycles. The greater the frequency difference between 57 and 58, within reason, the greater will be the frequency deviation produced.

Each of the crystals 57, 58 is electrically analogous to a large internal inductance connected in series with a small capacitance, the whole being shunted by a relatively large electrostatic capacitance which is of the same order of magnitude as the residual or fixed capacity of seismometer 55 and condenser 56. As a result, the effect of the shunt capacitance of the crystals is effectively balanced out by the fixed or residual capacitance of the seismometer and condenser 56 so that, in effect, two arms of the bridge circuit each consist of an inductance in series with a condenser of the same order of magnitude as the variations in capacitance produced by the seismic signals incident upon seismometer 55, while the other two bridge arms, in effect, consist of small condensers only. As a result, the variable capacitance of seismometer 55 readily controls the reactance of the bridge circuit and, hence, the oscillator frequency within the frequency range defined by the crystals 57 and 58. The bridge terminals 50, 52 are shunted by a resistor 59 which is analogous to the resistances 40 and 41 of Figure 1.

The oscillator circuit of Figure 2 utilizing the bridge of Figure 3 produces large changes in the oscillator frequency in response to relatively small seismic signals, and high frequency stability is provided on either side of the small frequency band in which the capacitance of the seismometer is the controlling factor.

The frequency of operation of the oscillator circuit of Figure 2, when using the feedback bridge of Figure 3, is given by the relation $$W^2 = \frac{4(W_1^2+W_2^2)+W_1^2 W_2^2 R_1 R_g (C_1+C_2) K}{2[4+R_1 R_g (W_1^2 C_1+W_2^2 C_2) K]} \quad (1)$$

$$\pm \frac{\sqrt{16(W_2^2-W_1^2)+W_1^2 W_2^2 R_1 R_g K [8(W_2^2-W_1^2)(C_1-C_2)+W_1^2 W_2^2 R_1 R_g (C_1+C_2)^2 K]}}{2[4+R_1 R_g (W_1^2 C_1+W_2^2 C_2) K]}$$

$$K = 4C_0 - \mu \Delta C$$

where, referring to Figure 3 and to Figure 10 which represents the equivalent circuits of crystals 57 and 58, $W = 2\pi f$ = angular frequency of operation of the oscillator
$W_1 = 2\pi f_1$ = angular frequency of crystal 57
$W_2 = 2\pi f_2$ = angular frequency of crystal 58
$C_1$ = effective series capacitance of crystal 57
$C_2$ = effective series capacitance of crystal 58
$C_0$ = shunt capacitance of each crystal, also the fixed capacitance in each of the other two bridge cams
$\mu$ = amplification factor of vacuum tubes
$\pm \Delta C$ = capacitance variation of seismometer 55 as produced by seismic waves
$R_1 = R_2$ = effective series resistance of piezo-electric crystals
$R_g$ = diagonal bridge resistance 59 and it has been assumed that:

(1) $C_0 \gg C_1, C_2$ or $\Delta C$
(2) $R_1 = R_2$; the dissipation in both crystals equal
(3) The grid and plate tank circuits have a negligible effect upon the frequency
(4) The bridge is operated sufficiently close to balance that it can be considered a "very lossy" network
(5) The modulating frequencies are very low compared with the carrier or oscillator frequencies A further approximation which can be obtained when the most probable magnitude of the quantities of Equation 1 are applied, gives a somewhat more simple result:

$$W^2 = \frac{4(W_1^2 + W_2^2) + W_1^2 W_2^2 R_1 R_g (C_1 + C_2) K (1 \pm 1)}{2[4 + R_1 R_g (W_1^2 C_1 + W_2^2 C_2) K]} \quad (2)$$

This gives $$\left. \begin{array}{l} W_A^2 = \dfrac{4(W_1^2 + W_2^2)}{2[4 + R_1 R_g (W_1^2 C_1 + W_2^2 C_2) K]} \\[2mm] W_B^2 = \dfrac{4(W_1^2 + W_2^2) + 2W_1^2 W_2^2 R_1 R_g (C_1 + C_2) K}{2[4 + R_1 R_g (W_1^2 C_1 + W_2^2 C_2) K]} \end{array} \right\} \quad (3)$$

It is seen from Equations 3 that two modes of operation are possible. In the "A" mode, the frequency of operation is slightly less than that of either crystal. Or if the bridge is re-arranged, this mode of operation is situated above the frequency of the highest crystal. In the "B" mode, the range of operation lies between the series resonant points of the two crystals.

Substitution of the following values in Equations 3 gives a typical result:

$W_1 = 6.28 \times 10^7$
$W_1^2 = 3.94 \times 10^{15}$
$W_2 = 6.28 \times 1.01 \times 10^7$
$W_2^2 = 4.02 \times 10^{15}$
$R_1 = 10^3$
$R_g = 10^6$
$C_1 = 5.05 \times 10^{-15}$
$C_2 = 5 \times 10^{-15}$
$\mu = 100$
$C_0 = 5 \times 10^{-12}$

| $\Delta C (\mu\mu f.)$ | $W_A^2$ | $W_B^2$ |
|---|---|---|
| $5 \times 10^{-5}$ | $3.3165284 \times 10^{15}$ | $3.9783329 \times 10^{15}$ |
| $1 \times 10^{-4}$ | $3.3163903 \times 10^{15}$ | $3.9783326 \times 10^{15}$ |
| $2 \times 10^{-4}$ | $3.3161139 \times 10^{15}$ | $3.9783319 \times 10^{15}$ |
| $5 \times 10^{-4}$ | $3.3152852 \times 10^{15}$ | $3.9783298 \times 10^{15}$ |
| $7 \times 10^{-4}$ | $3.3147330 \times 10^{15}$ | $3.9783284 \times 10^{15}$ |
| $1 \times 10^{-3}$ | $3.3139050 \times 10^{15}$ | $3.9783263 \times 10^{15}$ |
| $2 \times 10^{-3}$ | $3.3111480 \times 10^{15}$ | $3.9783194 \times 10^{15}$ |
| $5 \times 10^{-3}$ | $3.3029045 \times 10^{15}$ | $3.9782987 \times 10^{15}$ |
| $7 \times 10^{-3}$ | $3.2974316 \times 10^{15}$ | $3.9782850 \times 10^{15}$ |
| $1 \times 10^{-2}$ | $3.2892561 \times 10^{15}$ | $3.9782644 \times 10^{15}$ |
| $2 \times 10^{-2}$ | $3.2622950 \times 10^{15}$ | $3.9781967 \times 10^{15}$ |
| $5 \times 10^{-2}$ | $3.1840000 \times 10^{15}$ | $3.9780000 \times 10^{15}$ |
| $7 \times 10^{-2}$ | $3.1338582 \times 10^{15}$ | $3.9778400 \times 10^{15}$ |
| $1 \times 10^{-1}$ | $3.0615384 \times 10^{15}$ | $3.9776923 \times 10^{15}$ |
| $2 \times 10^{-1}$ | $2.8428571 \times 10^{15}$ | $3.9771428 \times 10^{15}$ |
| $5 \times 10^{-1}$ | $2.3411764 \times 10^{15}$ | $4.5030000 \times 10^{15}$ |

NOTE.—The above table is for positive values of $\Delta C$ only. Similar results are obtained when negative values of $\Delta C$ are substituted.

It is striking that by far the greatest frequency variation is produced for the "A" mode. Choice between modes may of course be obtained through the tuning of the grid and plate tank circuits.

The foregoing result having been obtained, it is clear that "A" mode operation may be obtained with one crystal, the other being replaced by its shunt capacity. This is confirmed by putting $W_2 = 0$ in Equation 3, whereupon $$W_A^2 = W_B^2 = \frac{2W_1^2}{4 + W_1^2 C_1 R_1 R_g K} \quad (4)$$

Figure 6:
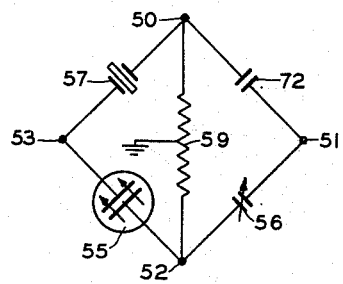

A circuit wherein the "A" mode of operation is obtained with one crystal is shown in Figure 6 and will be described hereafter.

Another condition of operation, which is of interest obtains when $\mu \Delta C$ is of the same magnitude as $4C_0$. Under these circumstances, very large frequency swings may be produced. This requires that $\mu$ be of the order of 10,000 or greater and of course means that several stages of amplification be used with a comparable degree of bridge balance. The same result may of course be approached by keeping $C_0$ as small as possible.

Figure 4:
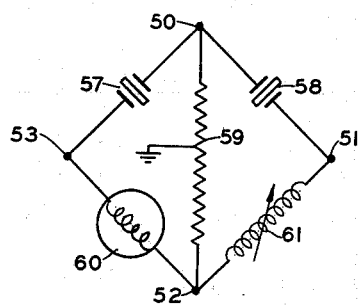

The bridge circuit of Figure 4 is similar to that shown by Figure 3 and corresponding parts are indicated by like reference characters. In this circuit, capacitive seismometer 55 is replaced by a seismometer 60 of the inductance type and this seismometer has its residual or fixed inductance balanced by an inductor 61 which takes the place of variable capacitance 56 in the circuit of Figure 2. The operation of the circuit is similar to that of Figure 2 except that, in this case, it is the residual inductances of the bridge components which are balanced out and the changes in reactance produced through changes in inductance of seismometer 60 change the reactance of the bridge circuit and, hence, control the frequency of the oscillator.

Figure 5:
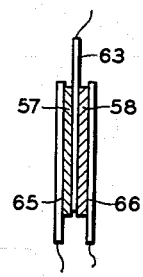
Figure 5 is a vertical sectional view of a crystal assembly used in the circuits of Figures 3 and 4.

The crystals 57, 58 of Figures 2 and 3 may be advantageously mounted as shown in Figure 5. This assembly includes an electrode 63 defined by a flat elongated strip of conductive metal and the crystals 57, 58 each have one face thereof secured to strip 63 while counter electrodes 65, 66 are secured to the other faces of the respective crystals. This provides a compact simple arrangement of the crystals which is very advantageous in the disclosed bridge circuit.

Broadly speaking, it is not necessary that the balancing arms 36, 37 of the bridge be piezoelectric crystals, as other types of impedances may be advantageously utilized. For example, at low frequencies, magnetostriction bars may be substituted for the crystals while, at extremely high frequencies, cavity resonators may be substituted for the crystals. In some cases, the seismometer may be of the variable resistance type, with the result that the other bridge arms are also resistances.

As previously stated, when using the "A" mode of crystal operation, a circuit utilizing only one crystal may be provided. Such a circuit is shown in Figure 6 which is adapted to be connected in the circuit of Figure 2 in the same manner as described in connection with Figures 3 and 4. In this circuit, the crystal 58 of Figure 3 is replaced by a condenser 72. This circuit may be used and operates in the manner described by Equation 4. With such a circuit, of course, the grid and plate tank circuits should be so tuned as to cause operation of the crystal in the "A" mode.

Figure 7:
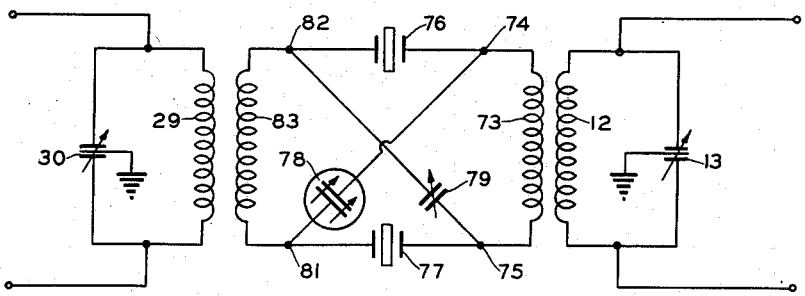

In a further modification of the invention, the Wheatstone bridge type null network may be inserted in the feed back loop between the output and input circuits of the radio frequency amplifier. Such a circuit is shown by Figure 7 as including a coil 73 inductively coupled to plate tank inductance 12. The coil 73, in turn, is connected to terminals 74, 75 of a lattice network defined by a crystal 76, a crystal 77, a seismometer 78, and a variable condenser 79. The terminals 81, 82 of the bridge are connected to a coil 83 which is inductively coupled to the grid tank coil 29 of Figure 2. It will be apparent that this circuit also fuctions in the manner described by Equations 1, 2 and 3, the difference in the circuit residing in the fact that the bridge is inductively coupled to the grid and tank circuits rather than directly connected thereto as in Figure 2.

In Figure 8, I have shown a null-type network which is not of the Wheatstone bridge type. Rather, this network is of the bridged-T type and, in accordance with the invention, it may be used as the null network of Figure 1. This type of network is particularly suited to single-ended circuits and in the application of this circuit both units 5 and 6, Figure 1, should be considered as single-ended circuits. Accordingly, the bridged-T circuit of Figure 8 may be inserted into Figure 1 at terminals 1 and 3, it being assumed that one or more suitable points of unit 6 are grounded, i. e., have the same potential as terminals 2 and 4, Figure 8. A resistance 86 is connected between conductor 85 and the junction of a capacitive seismometer 87 and a variable condenser 88 which are connected, respectively, to the terminals 1 and 3 of Figure 1 and shunted by a crystal 89. Preferably, when no signal is impressed upon the seismometer, the circuit is balanced and the frequency of the circuit is shifted in accordance with the amplitude of the signal applied to the seismometer.

In Figure 9, I have shown a circuit wherein a variable resistance type seismometer is utilized. This circuit is similar to that of Figure 6, except that the capacitive seismometer 55 and variable condenser 56 are replaced by a seismometer 91 of the variable resistance type and a variable resistor 92, respectively. In this circuit, seismic waves incident upon the seismometer are effective to change the resistance thereof in accordance with the amplitude of the seismic signals and this seismometer is balanced in the bridge circuit by the variable resistor 92.

While the invention has been described in connection with a present, preferred embodiment thereof, it is to be understood that this description is illustrative only and is not intended to limit the invention, the scope of which is defined by the appended claims.

Having described my invention, I claim:

1. A circuit for controlling a modulated oscillator which comprises, in combination, a radio frequency amplifier having an input circuit and an output circuit, a null-type network including a transducer for converting seismic waves into impedance variations representative thereof, means including a piezo-electrical crystal, and a variable impedance connected in circuit with said transducer to form a null-type network, means for feeding the output of said network to the input circuit of said amplifier, and means for feeding back a portion of the amplifier output to the input of said network.

2. A circuit for controlling a modulated oscillator which comprises, in combination, a pair of piezo-electric crystals and a pair of impedance units connected in a Wheatstone bridge arrangement, said crystals being mounted in adjacent legs of the bridge and having slightly different resonant frequencies, said impedance units being mounted in adjacent legs of the bridge, one of said units being a transducer for converting seismic waves into reactance variations representative thereof, whereby said reactance variations control the null frequency of the bridge circuit within the range between the crystal frequencies.

3. A modulated oscillator comprising, in combination, an amplifier having an input circuit and an output circuit, and means for feeding back a portion of the amplifier output to said input circuit to cause continuous oscillation of the system, said feed back means including a pair of piezo-electric crystals and a pair of impedance units connected in a Wheatstone bridge arrangement, said crystals being mounted in adjacent legs of the bridge and having slightly different resonant frequencies, said impedance units being mounted in adjacent legs of the bridge, one of said units being a transducer for converting seismic waves into reactance variations representative thereof, whereby said reactance variations control the resonant frequency of the bridge circuit within the range between the crystal frequencies, and whereby the oscillator is modulated by the seismic waves.

4. A circuit for controlling a modulated oscillator which comprises, in combination, a pair of piezo-electric crystals and a pair of condenser units connected in a Wheatstone bridge arrangement, said crystals being mounted in adjacent legs of the bridge and having slightly different resonant frequencies, said condenser units being mounted in adjacent legs of the bridge, one of said condenser units being a transducer for converting seismic waves into reactance variataions representative thereof, whereby said reactance variations control the resonant frequency of the bridge circuit within the range defined by the crystal frequencies.

5. A modulated oscillator comprising, in combination, an amplifier having an input circuit and an output circuit, means for feeding back a portion of the amplifier output to the input circuit to maintain the system in the continuous oscillation, said feed back means including a pair of piezo-electric crystals and a pair of condenser units connected in a Wheatstone bridge arrangement, said crystals being mounted in adjacent legs of the bridge and having slightly different resonant frequencies, said condenser units being mounted in adjacent legs of the bridge, one of said condenser units being a transducer for converting seismic waves into reactance variations representative thereof, whereby said reactance variations control the resonant frequency of the bridge circuit within the range defined by the crystal frequencies, and whereby the oscillator output is modulated by the reactance variations resulting from said seismic waves.

6. A circuit for controlling a modulated oscillator which comprises, in combination, a pair of piezo-electric crystals and a pair of inductance units connected in a Wheatstone bridge arrangement, said crystals being disposed in adjacent legs of the bridge and having slightly different resonant frequencies, said inductance units being disposed in adjacent legs of the bridge, and one of said inductance units being a transducer for converting seismic waves into reactance variations representative thereof, whereby said reactance variations control the resonant frequency of the bridge circuit within the range between the crystal frequencies.

7. A modulated oscillator comprising, in combination, an amplifier having an input circuit and an output circuit, means for feeding back a portion of the amplifier output to the input circuit to maintain the system in continuous oscillation, said feed back means including a pair of piezo-electric crystals and a pair of inductance units connected in a Wheatstone bridge arrangement, said crystals being disposed in adjacent legs of the bridge and having slightly different resonant frequencies, said inductance units being disposed in adjacent legs of the bridge, and one of said inductance units being a transducer for converting seismic waves into reactance variations representative thereof, whereby said reactance variations control the resonant frequency of the bridge circuit within the range between the crystal frequencies, and whereby the oscillator is modulated by the reactance variations representative of seismic waves.

8. A frequency modulated oscillator comprising, in combination, a pair of electron tubes each having an anode, a cathode, and a control grid, means for supplying operating potentials to the electrodes of said tubes, an anode tank circuit including a tank inductance and a condenser in shunt therewith connected between the anodes of the tubes, a grid tank circuit including an inductance and a condenser in shunt therewith connected between the control grids of said tubes, a Wheatstone bridge circuit including four impedances, one of said impedances being variable so that its reactance changes in accordance with the amplitude of seismic waves impressed thereon, and the value of the other impedances being such that the bridge is balanced at a predetermined operating frequency, whereby the resonant frequency of the bridge varies in accordance with the amplitude of said seismic waves, means connecting two opposite terminals of said bridge to the anodes of said electron tubes, and means connecting the other terminals of said bridge to the respective control grids of said electron tubes.

9. A frequency modulated oscillator comprising, in combination, a pair of electron tubes each having an anode, a cathode, and a control grid, means for supplying operating potentials to the electrodes of said tubes, an anode tank circuit including a tank inductance and a condenser in shunt therewith connected between the anodes of the tubes, a grid tank circuit including an inductance and a condenser in shunt therewith connected between the control grids of said tubes, a pair of piezo-electric crystals and a pair of impedance units connected in a Wheatstone bridge arrangement, said crystals being mounted in adjacent legs of the bridge and having slightly different resonant frequencies, said impedance units being mounted in adjacent legs of the bridge, and one of said units being a transducer for converting seismic waves into reactance variations representative thereof, a pair of series connected resistors connected to two opposite terminals of the bridge, a lead grounding the junction between said resistances, means connecting two opposite terminals of said bridge to the anodes of said electron tubes, and means connecting the other terminals of said bridge to the respective control grids of said electron tubes.

10. A frequency modulated oscillator comprising, in combination, a pair of electron tubes each having an anode, a cathode, and a control grid, means for supplying operating potentials to the electrodes of said tubes, an anode tank circuit including a tank inductance and a condenser in shunt therewith connected between the anodes of the tubes, a grid tank circuit including an inductance and a condenser in shunt therewith connected between the control grids of said tubes, a pair of piezo-electric crystals, a capacitive seismometer, and a variable condenser connected in a Wheatstone bridge arrangement, said crystals being disposed in adjacent legs of the bridge and having slightly different resonant frequencies, an impedance interconnecting two opposite terminals of the bridge, means connecting two opposite terminals of said bridge to the anodes of said electron tubes, and means connecting the other terminals of said bridge to the respective control grids of said electron tubes.

11. A frequency modulated oscillator comprising, in combination, a pair of electron tubes each having an anode, a cathode, and a control grid, means for supplying operating potentials to the electrodes of said tubes, an anode tank circuit including a tank inductance and a condenser in shunt therewith connected between the anodes of the tubes, a grid tank circuit including an inductance and a condenser in shunt therewith, a pair of piezo-electric crystals, a variable inductance seismometer, and a balancing inductance all connected in a Wheatstone bridge arrangement, said crystals being disposed in adjacent legs of the bridge and having slightly different resonant frequencies, an impedance connected between two opposite terminals of the bridge, means connecting two opposite terminals of said bridge to the anodes of said electron tubes, and means connecting the other terminals of said bridge to the respective control grids of said electron tubes.

12. A circuit for controlling a modulated oscillator which comprises, in combination, a capacitive type seismometer, a piezo-electric crystal, and a pair of condensers connected in a Wheatstone bridge arrangement, a resistor connected across two opposite terminals of said bridge, a radio frequency amplifier having an input circuit and an output circuit, means for connecting two opposite terminals of the bridge to the input circuit of said amplifier, and means for feeding back a portion of the amplifier output to the other opposite terminals of said bridge.

13. A modulated oscillator comprising, in combination, an amplifier having a grid tank coil and a plate tank coil, a null-type network including a pair of piezo-electric crystals and a pair of condenser units connected to form a lattice, said crystals having slightly different resonant frequencies, and one of said condenser units being a transducer for converting seismic waves into reactance variations representative thereof, a coil inductively coupled to said plate tank coil and connected to two opposite terminals of said lattice, and a coil inductively coupled to said grid tank coil and connected to the other opposite terminals of said lattice.

14. A circuit for controlling a modulated oscillator which comprises, in combination, a null-type network including a piezo-electric crystal, a unit in shunt with said crystal including a seismometer having a variable impedance connected in series therewith, a resistance connected to the junction between said variable impedance and said seismometer, a set of input terminals connected respectively to said resistance and one terminal of said crystal, and a set of output terminals connected, respectively, to said resistance and the other terminal of said crystal.

15. A circuit for controlling a modulated oscillator which comprises, in combination, a Wheatstone bridge circuit including a piezo-electric crystal, a condenser having a reactance equal to the shunt capacity of said crystal, a variable resistance, and a seismometer for converting seismic waves into resistance variations representative thereof, a set of input terminals connected to two opposite terminals of said bridge, and a set of output terminals connected to the other opposite terminals of said bridge.

GLEN PETERSON.

References Cited in the file of this patent

UNITED STATES PATENTS

| Number | Name | Date |
| --- | --- | --- |
| 2,159,237 | Usselman | May 23, 1939 |
| 2,321,269 | Artzt | June 8, 1943 |
| 2,345,712 | Mohr | Apr. 4, 1944 |
| 2,386,049 | Hausz | Oct. 2, 1945 |
| 2,407,293 | Shepherd | Sept. 10, 1946 |
| 2,451,858 | Mork | Oct. 19, 1948 |
| 2,469,803 | Weathers | May 10, 1949 |